United States Patent
Jeli et al.

(10) Patent No.: US 8,136,709 B2
(45) Date of Patent: Mar. 20, 2012

(54) ARTICLE CARRIERS

(75) Inventors: Richard Jeli, Milwaukie, OR (US); Mike Kemery, Portland, OR (US); Steve Rodden, Sherwood, OR (US); Peter Jones, Portland, OR (US)

(73) Assignee: Yakima Products, Inc., Beaverton, OR (US)

( * ) Notice: Subject to any disclaimer, the term of this patent is extended or adjusted under 35 U.S.C. 154(b) by 1236 days.

(21) Appl. No.: 11/657,708

(22) Filed: Jan. 23, 2007

(65) Prior Publication Data

US 2007/0235489 A1 Oct. 11, 2007

Related U.S. Application Data

(60) Provisional application No. 60/762,220, filed on Jan. 23, 2006, provisional application No. 60/776,384, filed on Feb. 24, 2006.

(51) Int. Cl.
*B60R 9/12* (2006.01)

(52) U.S. Cl. ......... 224/323; 224/316; 224/319; 224/558

(58) Field of Classification Search .................. 224/319, 224/316, 323, 320, 917.5, 321, 324, 570, 224/571, 282, 533, 536, 309
See application file for complete search history.

(56) References Cited

U.S. PATENT DOCUMENTS

| | | | |
|---|---|---|---|
| 993,954 A | 5/1911 | Budlong | |
| 2,630,257 A * | 3/1953 | Nielsen | 224/314 |
| 2,765,016 A | 10/1956 | Parsegian | |
| 2,840,288 A | 6/1958 | Broddon | |
| 2,948,560 A | 8/1960 | Rop | |
| 2,999,378 A | 9/1961 | Blair | |
| 3,165,353 A * | 1/1965 | Weise | 296/210 |
| 3,242,704 A | 3/1966 | Barreca | |
| 3,719,297 A * | 3/1973 | Nowicki | 414/462 |
| 3,848,785 A | 11/1974 | Boll | |
| 3,999,409 A | 12/1976 | Bell | |
| 4,261,496 A * | 4/1981 | Mareydt et al. | 224/315 |
| 4,694,666 A | 9/1987 | Bellingham | |
| 4,728,019 A | 3/1988 | Olliges | |
| 4,735,350 A | 4/1988 | Kamaya | |
| 5,119,980 A * | 6/1992 | Grim et al. | 224/315 |
| 5,253,792 A * | 10/1993 | Foster et al. | 224/321 |
| 5,456,397 A * | 10/1995 | Pedrini | 224/324 |
| 7,108,163 B1 * | 9/2006 | Pedrini | 224/319 |
| 2006/0237500 A1 * | 10/2006 | Settelmayer | 224/325 |

FOREIGN PATENT DOCUMENTS

| | | |
|---|---|---|
| DE | 2556352 | 6/1977 |
| FR | 2633569 | 1/1990 |

OTHER PUBLICATIONS

Locking Ski Mount literature by Yakima Products, 1 page, Jan. 1989.
The New Yakima Over-Center Wheel Strap literature by Yakima Products, 1 page, Jan. 1989.

* cited by examiner

*Primary Examiner* — Justin Larson
*Assistant Examiner* — Corey Skurdal
(74) *Attorney, Agent, or Firm* — Kolisch Hartwell, P.C.

(57) ABSTRACT

A rack for carrying skis and snowboards on top of a vehicle includes a pair of clamp devices equipped for mounting on a pair of crossbars. Each clamp device has a collapsible position which reduces its forward facing profile when not being used to carry cargo items.

22 Claims, 7 Drawing Sheets

ARTICLE CARRIERS

CROSS-REFERENCE TO RELATED APPLICATIONS

This application is based upon and claims priority under 35 U.S.C. §119 from U.S. Provisional Patent Applications Ser. No. 60/762,220 filed Jan. 23, 2006 and Ser. No. 60/776,384 filed Feb. 24, 2006, which are incorporated herein by reference in their entirety for all purposes.

This application also incorporates by reference in their entirety for all purposes the following patent and patent applications: U.S. Pat, No. 5,119,980 issued Jun. 9, 1992, Ser. No. 11/300,603 filed Dec. 13, 2005 and Ser. No. 11/198,901 filed Aug. 5, 2005.

FIELD OF THE INVENTION

The invention relates to assemblies for carrying articles on a vehicle. In particular, the invention provides improvements for article carriers designed for mounting on one or more crossbars on a vehicle rack system of a vehicle.

BACKGROUND

Top-mounted vehicle rack systems provide a versatile platform for transporting bicycles, skis, snowboards, boats, cargo boxes, gear racks, and/or other items. Such rack systems typically use pairs of crossbars that extend side-to-side across the top of a vehicle. Each crossbar is typically supported on each side of the vehicle's roof by a tower, where the length of each crossbar and the distance between crossbars depend on factors such as the shape and size of the vehicle's roof, and type(s) of cargo being carried. The towers supporting the rack crossbars are securely fastened to the vehicle in a suitable manner.

Various article carriers are designed for mounting on a set of crossbars, and to carry a variety of articles such as bicycles, skis, snowboards, and/or boats. For example, clamp devices are used to secure skis and snowboards in a scissor-like fashion. However, some clamp devices have problems such as; failing to fit or adapt to certain vehicle or factory rack configurations; failing to accommodate skis or snowboards with bulky bindings or attachments; and unsatisfactory adjustability to secure equipment of different shapes and thicknesses. Moreover, article carriers mounted on vehicle roof tops typically increase the height profile of the vehicle. Increased front facing profile or surface area may cause wind resistance related problems, such as increased driving noise, reduced fuel efficiency, etc. Users may remove the article carriers when not in use to avoid or minimize such problems. However, removing the article carriers between uses may not be convenient or desirable.

DESCRIPTION OF THE INVENTION

Figures 1, 2, 3:
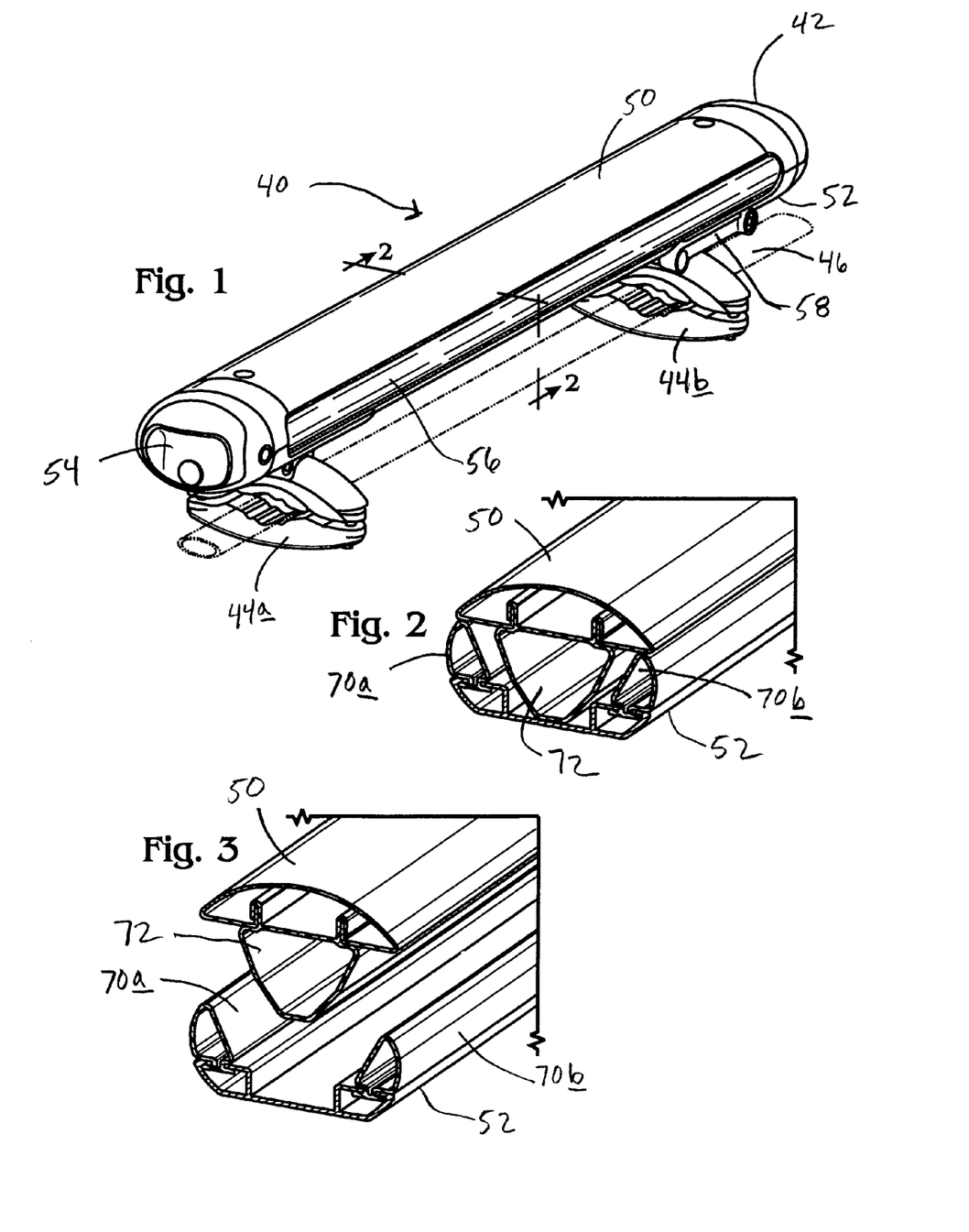
FIG. 1 is a perspective view of a clamping device for a ski rack mounted on a crossbar.
FIG. 2 is a partial cross-sectional view through the clamping device shown in FIG. 1.
FIG. 3 is a partial cross-sectional view of the clamping device, similar to the view shown in FIG. 2, except partially open.

FIG. 1 shows ski or snowboard clamp 40 including main body 42 mounted via crossbar clamps 44a, 44b to crossbar 46. Main body 42 includes elongate rigid top portion 50 hinged at one end to corresponding elongate rigid bottom portion 52. A latch device is provided at the proximal end, as shown in FIG. 1. Actuator device 54, for example, may be a depressible pad or button, is provided for a user to unlatch and open the clamp when loading or unloading skis or snowboards. Flexible gripping strips 56 are provided on interfacing sides of top portion 50 and bottom portion 52 for gripping skis and snowboards. Gripping strips 56 are preferably made of rubber or a similar flexible material which has conformable properties and is soft enough to grip equipment without scratching, scraping or damaging the equipment.

FIGS. 2 and 3 show cross-sectional views through clamp device 40. Each of top and bottom portions 50, 52 have gripping strips which are configured to nest or interleave in a collapsed position when clamp device 40 is not being used to carry skis or snowboards. The nesting profiles of strips 56 allow clamp device 40 to assume a smaller, more aerodynamic, profile when clamp device 40 is not being used to carry skis or snowboards. FIG. 2 shows flexible gripping strips 70a, 70b attached to bottom portion 52. Gripping strip 72 is attached to top portion 50. FIG. 2 shows a collapsed position in which gripping strips 70a, 70b flank gripping strips 72. In FIG. 3, top portion 50 is elevated relative to bottom portion 52, permitted by an expanding hinge, shown in FIGS. 4-6, and discussed below. Gripping strips 70a, 70b and 72 are spaced by an appropriate distance for carrying skis or snowboards.

Figure 4:
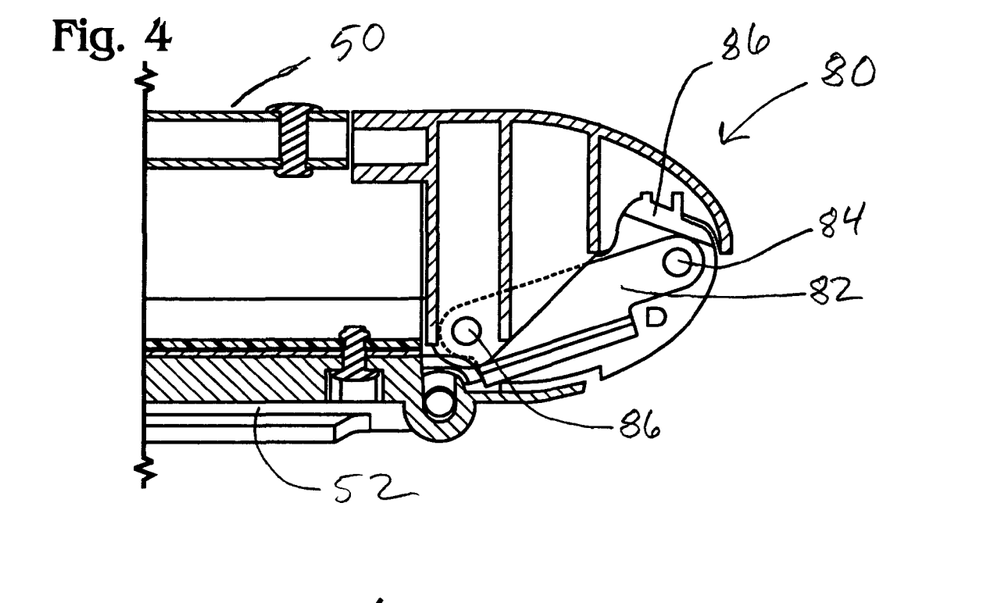
FIGS. 4-6 are partial sectional rear views of an expanding hinge device employed in a clamp device, shown in various positions.
Figure 5:
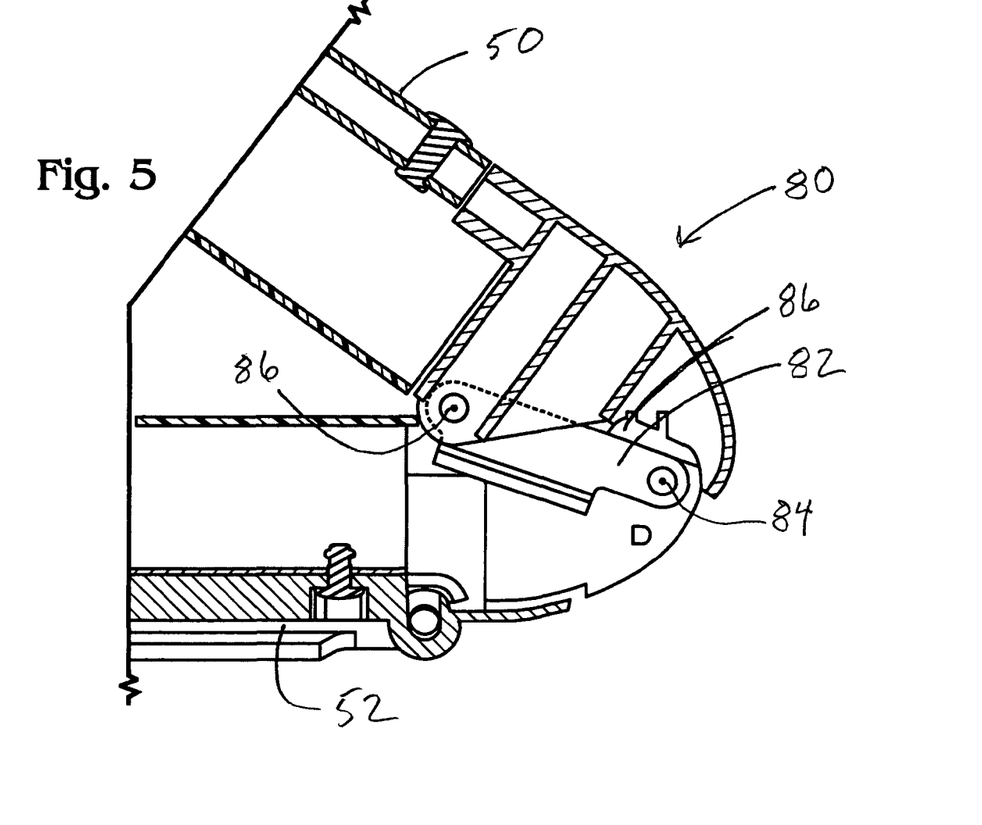
Figure 6:
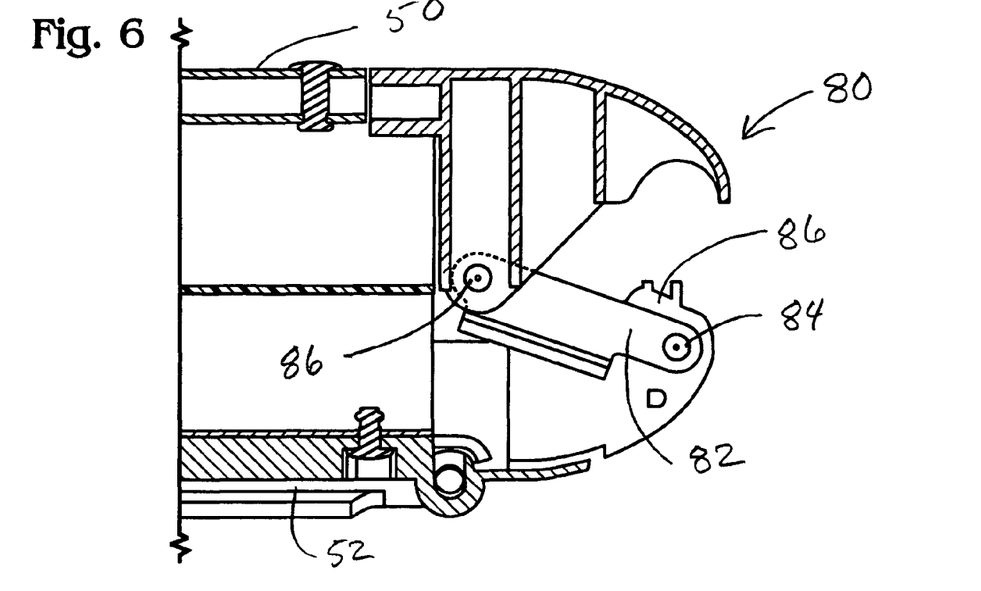

FIGS. 4-6 illustrate an expanding hinge device used to connect top portion 50 to bottom portion 52, and to permit a collapsed aerodynamic closed position, and alternately an expanded closed position for carrying skis and snowboards. Hinge device 80 connects top portion 50 to bottom portion 52. Hinge device 80 includes link member 82 which is pivotally connected to bottom portion 52 at point 84 and pivotally connected to top portion 50 at point 86. Hinge device 80 also has a stop structure 86 which limits rotation of link member 82 around point 84. FIG. 4 shows hinge 80 in its collapsed position allowing top and bottom portions 50 and 52 to nest into a maximally aerodynamic profile when not carrying skis or snowboards. FIG. 5 shows top portion 50 pivoting upward for loading or unloading skis or snowboards. In FIG. 5, link member 82 has pivoted clockwise around point 84 until link member 82 abuts stop structure 86. In FIG. 6, with link member 82 still abutting stop structure 86, top portion 50 has been rotated counterclockwise around pivot point 86 into a closed position with hinged device 80 in an expanded closed configuration for securing skis or snowboards for transport.

Figure 7:
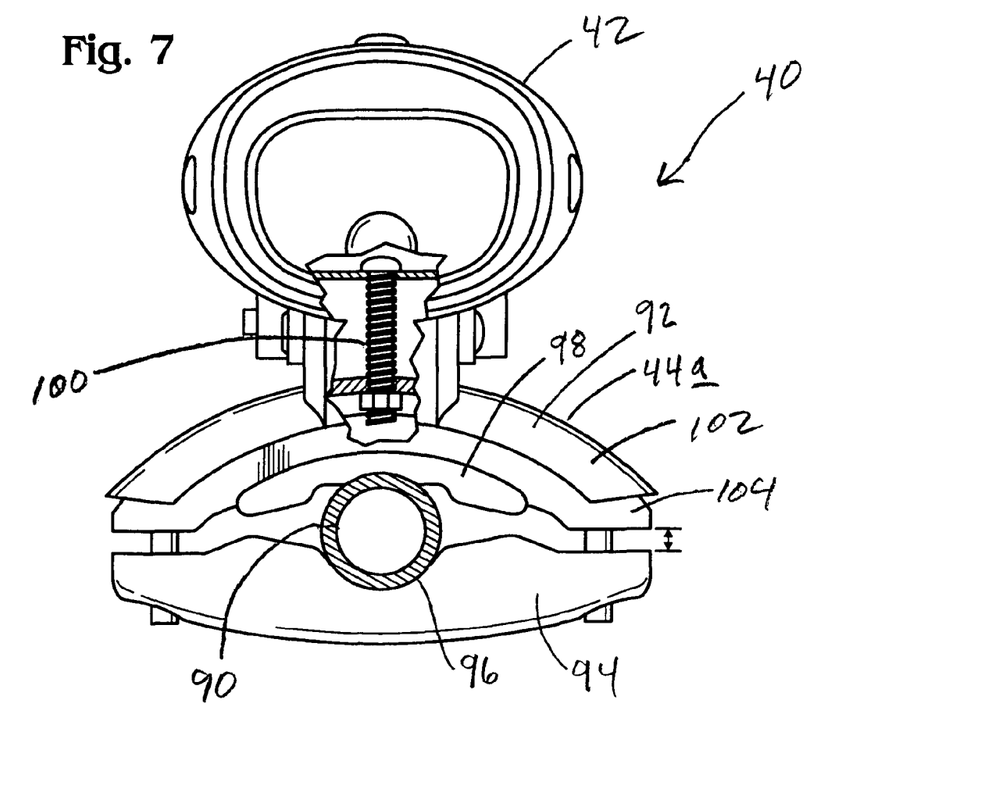
FIGS. 7 and 8 show side views of a clamp device mounted on crossbars having different shapes.
Figure 8:
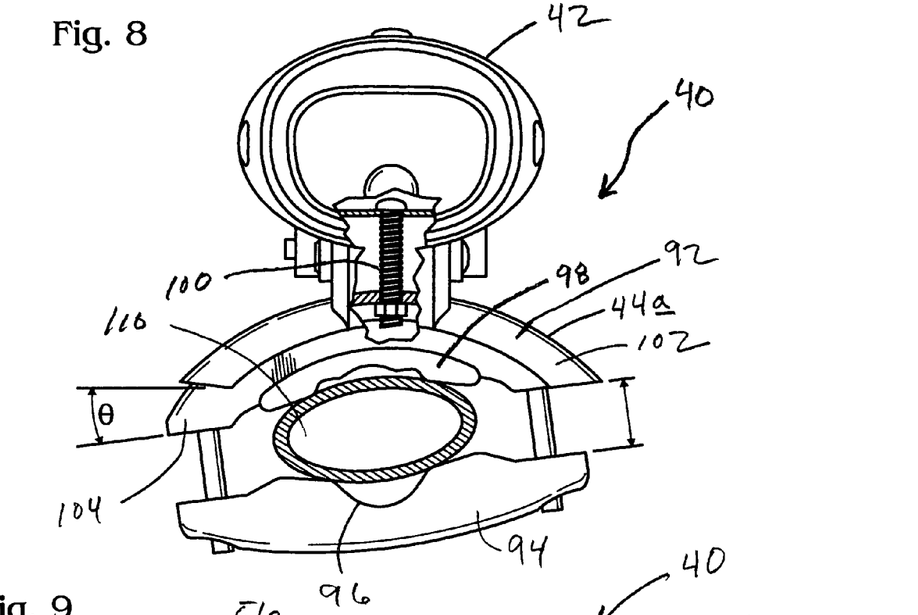

FIGS. 7 and 8 illustrate how crossbar clamp 44a is adaptable to fit crossbars having different shapes and orientations. In FIG. 7 ski or snowboard clamp device 40 uses crossbar clamp 44a to rigidly connect main body 42 to circular crossbar 90. Crossbar clamp 44a includes upper jaw member 92 connected to lower jaw member 94 via bolts or similar linkage devices. Lower jaw member 94 has a concave depression 96 for seating an external surface of circular crossbar 90. Upper jaw member 92 has conformable pad 98 for gripping and adapting to another surface of crossbar 90. Bolt device 100 is used to connect main body 42 to crossbar clamp 44a. Upper jaw member 92 includes top piece 102 which overlaps and is slidable relative to bottom piece 104 when bolt device 100 is not tight. FIG. 8 shows crossbar clamp 44a connected to crossbar 110 which has an oval cross-sectional shape that is oriented with a tilt to one side. As shown in FIG. 8, top piece 102 of upper jaw member 92 remains centered relative to bolt device 100 and main body 42. The objective here is for main body 42 to remain in a substantially vertical orientation relative to the top of the vehicle. Bottom piece 104 has slid or rotated by angle θ, along with lower jaw member 94 and conformable pad 98 to adapt to the tilted orientation of crossbar 110. Tightening of bolt device 100 maintains the relative positions of top piece 102 and bottom piece 104 of crossbar clamp 44a.

Figures 9, 10:
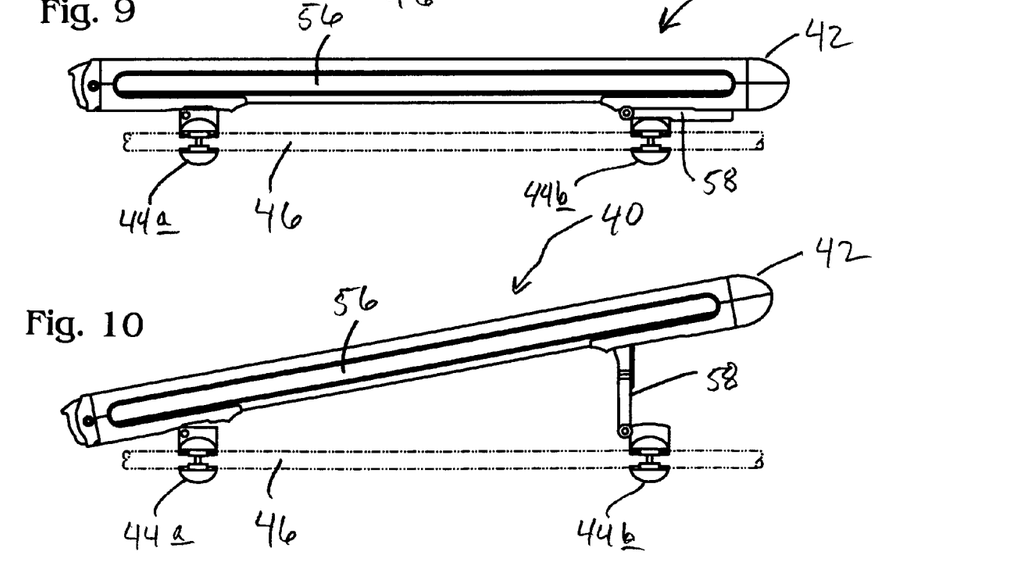
FIG. 9 shows a rear view of a clamp device.
FIG. 10 shows the clamp device of FIG. 9 with one end elevated to provide space below the clamp device.

FIGS. 9 and 10 show clamp device 40 on crossbar 46, illustrating use of elevator link or strut 58 to raise one end of main body 42 to provide extra space for accommodating bindings or other structures on skis or snowboards. In FIG. 9, elevator strut 58 is horizontal in a stowed, unused position. Elevator strut 58 may remain stowed either when clamp device 40 is not being used to carry any equipment, or when carrying equipment that does not need additional clearance between the rack and the top of the vehicle. In FIG. 10, elevator link 58 is in a substantially vertical position providing additional space below the rack.

Figures 11, 12:
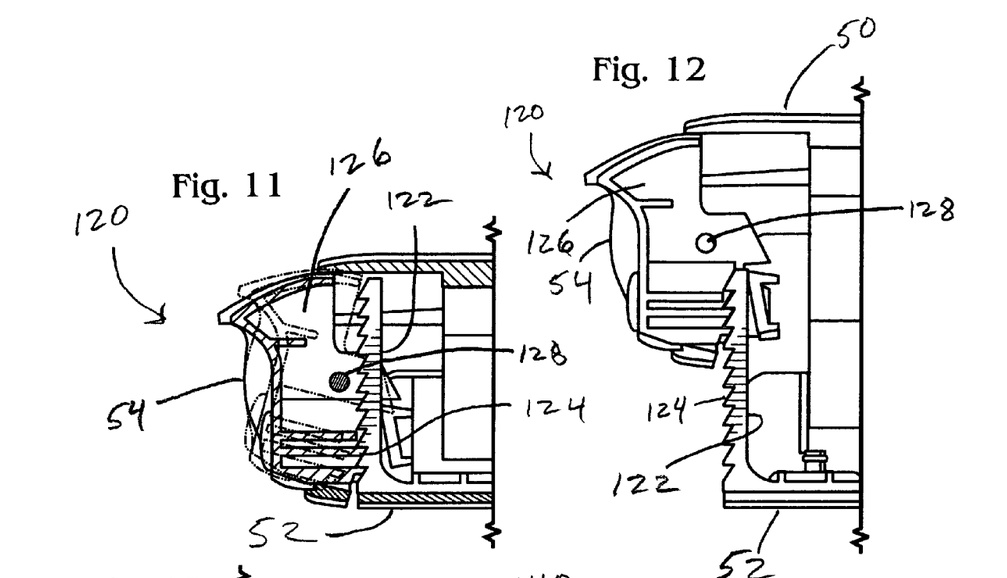
FIG. 11 shows a partial cross-sectional rear view of a ratcheting latch device when the clamp device is in a collapsed position.
FIG. 12 shows a partial cross-sectional rear view of a ratcheting latch device when the clamp device is in an expanded position for carrying skis or snowboards.

FIGS. 11 and 12 illustrate details of ratcheting latch device 120 which is used to secure top portion 50 to bottom portion 52. FIG. 11 shows latch device 120 securing top portion 50 and bottom portion 52 in a nested collapsed position. FIG. 12 shows latch device 120 securing top portion 50 to bottom portion 52 with a hinge device (not shown) provided at the other end of the clamp device, in an expanded orientation for carrying skis or snowboards. As shown in FIGS. 11 and 12, bottom portion 52 of clamp device 40 has one, two, three or more harpoon structures 122 projecting vertically upward. Harpoon structure 122 has teeth 124 for engaging corresponding teeth on latch member 126. Latch member 126 is connected to top portion 50 and has a limited degree of rotational freedom around pivot point 128. Latch member 126 may be spring-biased in a counterclockwise direction to facilitate latching engagement with teeth 124 on harpoon(s) 122.

Figures 13, 14:
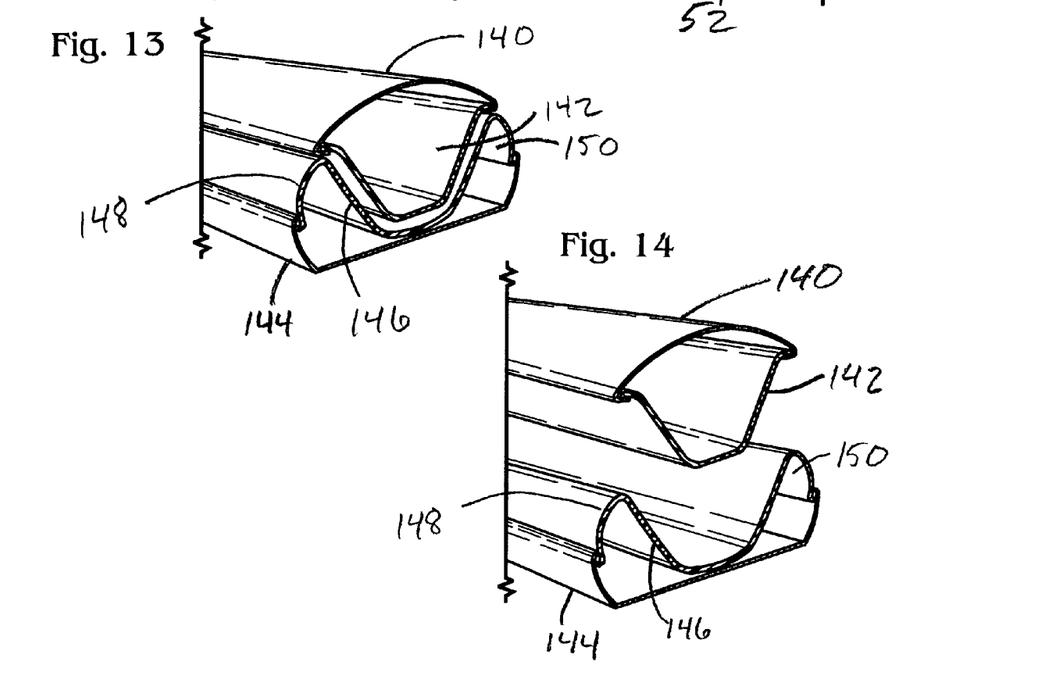
FIGS. 13 and 14 show partial perspective sectional views of an alternative nesting clamp device, in collapsed and expanded positions, respectively.

FIGS. 13 and 14 show alternative nesting gripping strip configurations for use on top and bottom portions of a clamp device. Top portion 140 has V-shaped pliable gripping strip 142. Bottom portion 144 has M-shaped pliable gripping strip 148 including lateral ridge portions 148 for flanking V-shaped gripping strip 142 of top portion 140. FIG. 13 shows the gripping strips nested providing an enhanced aerodynamic profile clamping device when it is not being used to carry skis or snowboards. FIG. 14 shows gripping strips 142,146 spaced apart in a suitable position for carrying skis or snowboards. Numerous other nesting flexible strip configurations may be used. In the examples described, top and bottom strip configurations may be interchanged.

Figure 15:
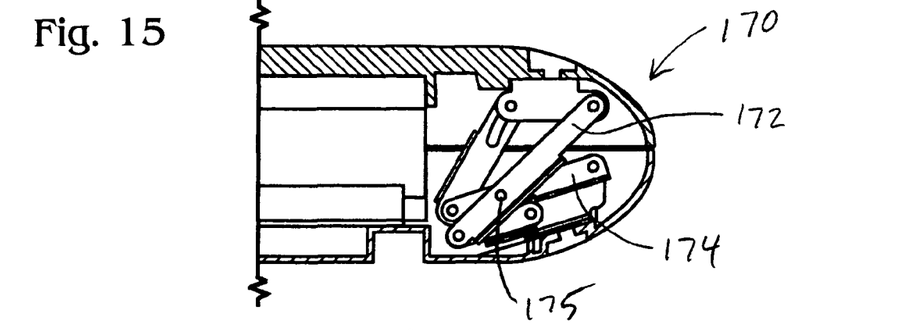
FIGS. 15-17 show partial rear sectional views of a clamp device employing an alternate expanding hinge configuration.
Figure 16:
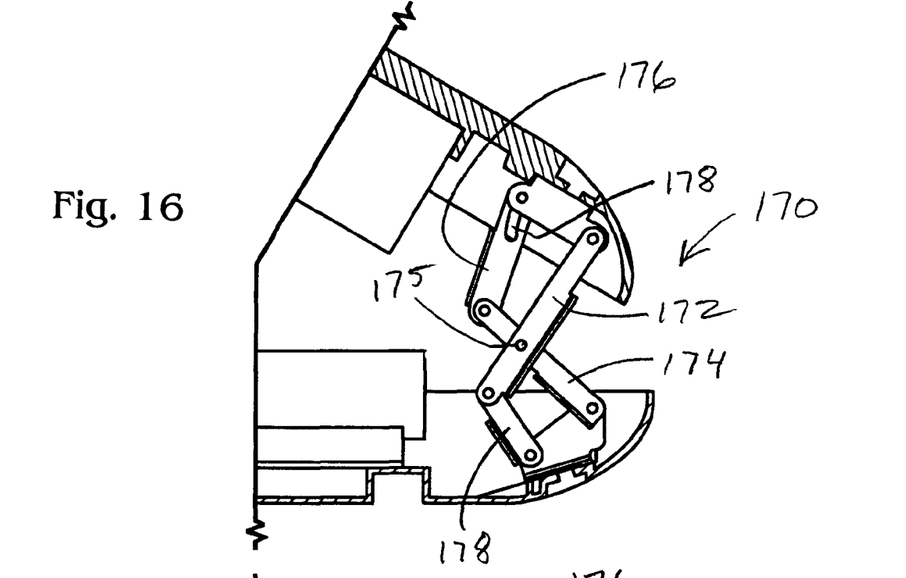
Figure 17:
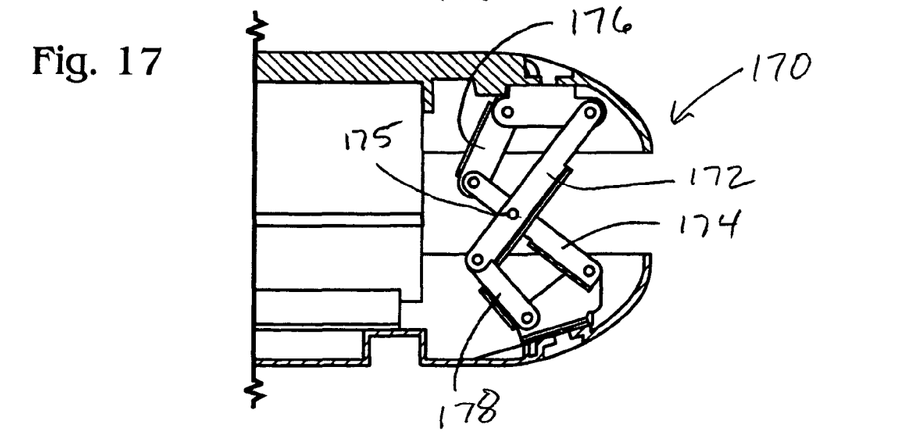

FIGS. 15-17 illustrate an alternate hinge device 170. FIG. 15 shows hinge device 170 in its collapsed position for securing the clamp device in a nested aerodynamic profile. FIG. 16 shows hinge device 170 expanding as the clamp device is opened. FIG. 17 shows the clamp device closed with hinge device 170 expanded for carrying skis or snowboards. Hinge device 170 uses criss-crossing bars 172 and 174 which are pivotally connected at point 175. Bar 174 connects the bottom portion to another shorter linkage bar 176 which is connected to the top portion of the clamp device. Bar 172 is pivotally connected to the top portion and to linkage member 178 which is connected to the bottom portion of the clamp device. As shown in FIGS. 15 and 16, linkage member 176 has a slot 178 for facilitating opening and closing movement of the top portion of the clamp device with hinge device 170 in an expanded position.

Figures 18, 19, 20:
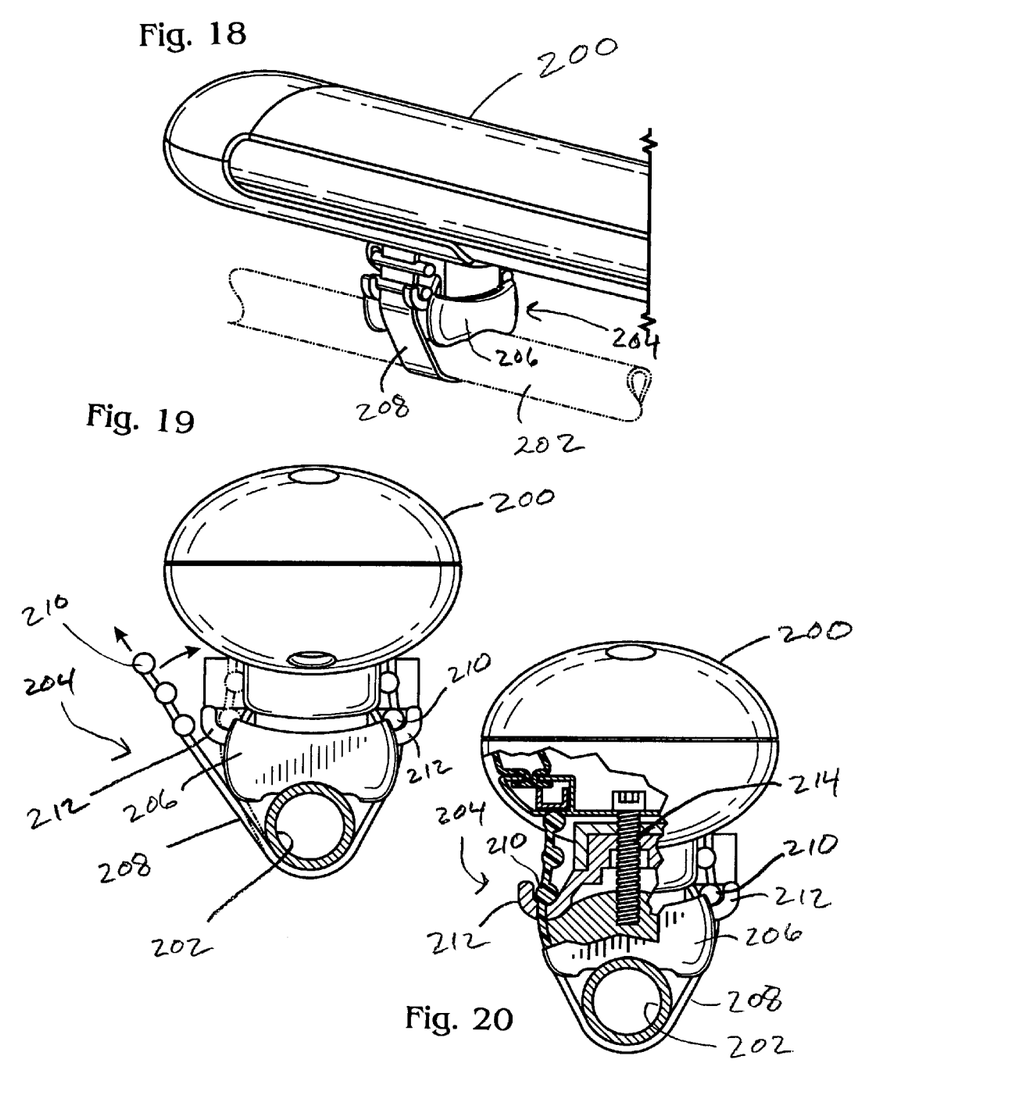
FIG. 18 shows a partial perspective view of an alternate ski or snowboard clamping device, employing a crossbar clamp including a flexible strap member.
FIG. 19 shows a side view of the ski or snowboard clamp of FIG. 18.
FIG. 20 shows a side cut-away view of the clamp device shown in FIGS. 18 and 19.

FIGS. 18-20 illustrate an alternate crossbar clamp device which uses a conformable, flexible strap member to accommodate crossbars of different shapes. FIG. 18 shows main body 200 of a clamp device mounted on crossbar 202 of the crossbar clamp device 204. Crossbar clamp device 204 has upper portion 206 which is contoured to accommodate a top surface of a crossbar. Strap 208 is connected on both ends to upper portion 206 surrounding crossbar 202. The effective length of strap 208 may be grossly adjusted by selecting appropriate knob or peg structures 210 for placement in holders 212 of upper portion 206, as shown in FIG. 19. FIG. 20 shows a cut-away from the view shown in FIG. 19, illustrating a final tightening device. Rotation of bolt member 214 causes upward movement of holders 212 relative to upper portion 206, effectively tightening strap 208 around crossbar 202.

Although vehicle top carriers and features of vehicle top carriers have been shown and described with reference to the foregoing operational principles and preferred embodiments, those skilled in the art will find apparent that various changes in form and detail may be made without departing from the spirit and scope of the claims. The present disclosure is intended to embrace all such alternatives, modifications, and variances that fall within the scope of the appended claims.

We claim:
1. A rack for carrying skis or a snowboard comprising
a pair of cross bars equipped for mounting on the roof of a vehicle,
a pair of clamp devices, each clamp device having a base equipped for mounting on one of the crossbars, and a top portion, the base and top portion being connected by a hinge at one end, the base having a rigid part and at least one flexible inner strip member and the top portion having a rigid part and at least one flexible inner strip member that compliments the at least one flexible inner strip member of the base for cooperatively gripping skis or snowboards, wherein the hinge is expandable, wherein the at least one flexible inner strip member of one of the base and top portion at least partially forms a linear cavity, and the at least one flexible inner strip member of the other of the base and top portion is (a) directly connected to the rigid part of the other of the base and top portion and (b) completely received in the linear cavity when the clamp devices are not being used to carry skis or snowboards.

2. The rack of claim 1, wherein each clamp device is equipped with a collapsible elevating strut for elevating one end of the clamp device.

3. The rack of claim 1, wherein one of the base and top portion has a central flexible strip member, the other of the base and top portion having a pair of lateral flexible strip members, the central strip member fitting between the lateral strip members when the strip member are nested.

4. The rack of claim 3, wherein the lateral strip members are connected to the base.

5. The rack of claim 1, wherein one of the base and the top portion has a substantially V-shaped flexible strip member, the other of the base and the top portion having a substantially M-shaped flexible strip member, the strip members being configured to stack in close proximity to each other when the clamp device is in a collapsed position.

6. The rack of claim 1, each clamp device having a pair of crossbar clamps, each crossbar clamp being adjustable to accommodate crossbars of different shape or orientation.

7. The rack of claim 6, wherein the crossbar clamp includes a strap.

8. The rack of claim 1, wherein the hinge includes a link member having first and second end portions, the first end portion of the link member being pivotally connected to a first pivot point on the base and the second end portion of the link member being connected to a second pivot point on the top portion.

9. The rack of claim 1, wherein the range of pivotal movement of the link member around the first pivot point provides limited but sufficient expansion for securing skis or snowboards between the base and top portion.

10. A clamp assembly for securing skis or a snowboard on crossbars on top of a vehicle comprising
a pair of clamp devices, each clamp device having a base equipped for mounting on a crossbar, and a top portion, the base and top portion being connected by a hinge at one end, the base having a rigid part and the top portion having a rigid part, the base and top portion additionally having complimenting flexible inner strip members for cooperatively gripping skis or snowboards, wherein the hinge is expandable allowing the inner strip members to nest such that, when the clamp devices are not being used to carry skis or snowboards, at least a first of the inner strip members is exposed, and at least a second of the inner strip members is completely enclosed by (a) the rigid part of the base, (b) the rigid part of the top portion, and c the at least a first of the inner strip members.

11. The clamp assembly of claim 10, wherein one of the base and top portion has a central flexible strip member, the other of the base and the top portion having a pair of lateral flexible strip members, the central strip member fitting between the lateral strip members when the strip member are nested.

12. The clamp assembly of claim 11, wherein the lateral strip members are connected to the base.

13. The clamp assembly of claim 10, wherein one of the base and the top portion has a substantially V-shaped flexible strip member, the other of the base and the top portion having a substantially M-shaped flexible strip member, the strip members being configured to stack in close proximity to each other when the clamp device is in a collapsed position.

14. The clamp assembly of claim 10, wherein the hinge includes a link member having first and second end portions, the first end portion of the link member being pivotally connected to a first pivot point on the base and the second end portion of the link member being connected to a second pivot point on the top portion.

15. The clamp assembly of claim 14, wherein the range of pivotal movement of the link member around the first pivot point provides limited but sufficient expansion for securing skis or snowboards between the base and top portion.

16. The clamp assembly of claim 10, wherein each clamp device is equipped with a collapsible elevating strut for elevating one end of the clamp device.

17. A clamp assembly for securing skis or a snowboard on crossbars on top of a vehicle comprising
a pair of clamp devices, each clamp device having a base equipped for mounting on a crossbar, and a top portion, the base and top portion being connected by a hinge at one end, the base and top portion having complimenting first and second flexible inner strip members, respectively, for cooperatively gripping skis or snowboards, wherein each clamp device has a use position for securely carrying skis or snowboards, and a collapsed position which reduces wind resistance when the clamp devices are not being used to carry skis or snowboards, the first and second inner strip members being configured such that, in the collapsed position, the first inner strip member contacts a part of the top portion other than the second inner strip member.

18. The clamp assembly of claim 17, wherein the hinge is expandable allowing the strip members to nest when the clamp devices are not being used to carry skis or snowboards.

19. The clamp assembly of claim 18, wherein the hinge includes a link member having first and second end portions, the first end portion of the link member being pivotally connected to a first pivot point on the base and the second end portion of the link member being connected to a second pivot point on the top portion.

20. The clamp device of claim 19, wherein the range of pivotal movement of the link member around the first pivot point provides limited but sufficient expansion for securing skis or snowboards between the base and top portion.

21. The clamp assembly of claim 17, wherein the first and second inner strip members are further configured such that, in the collapsed position, the second inner strip member contacts a part of the base other than the first inner strip member.

22. A clamp assembly for securing skis or a snowboard on crossbars on top of a vehicle comprising
a pair of clamp devices, each clamp device having a base equipped for mounting on a crossbar, and a top portion, the base and top portion being connected by a hinge at one end, the base and top portion having complimenting first and second flexible inner strip members, respectively, for cooperatively gripping skis or snowboards, wherein each clamp device has a use position for securely carrying skis or snowboards, and a collapsed position which reduces wind resistance when the clamp devices are not being used to carry skis or snowboards, the first and second inner strip members being configured such that, in the collapsed position, the second inner strip member contacts a part of the base other than the first inner strip member.

* * * * *